(12) United States Patent
Okamura

(10) Patent No.: US 10,843,079 B2
(45) Date of Patent: *Nov. 24, 2020

(54) GAME DEVELOPMENT SYSTEM

(71) Applicant: NINTENDO CO., LTD., Kyoto (JP)

(72) Inventor: Yuichiro Okamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 98 days.

This patent is subject to a terminal disclaimer.

(21) Appl. No.: 16/235,619

(22) Filed: Dec. 28, 2018

(65) Prior Publication Data

US 2019/0134507 A1 May 9, 2019

Related U.S. Application Data

(63) Continuation of application No. 15/699,073, filed on Sep. 8, 2017, now Pat. No. 10,300,387.

(30) Foreign Application Priority Data

Dec. 22, 2016 (JP) .................................. 2016-250181

(51) Int. Cl.
  *A63F 13/60* (2014.01)
  *G06F 3/0484* (2013.01)
  *G06F 8/34* (2018.01)
  *A63F 13/35* (2014.01)
  *A63F 13/70* (2014.01)

(52) U.S. Cl.
  CPC .............. *A63F 13/60* (2014.09); *A63F 13/35* (2014.09); *A63F 13/70* (2014.09); *G06F 3/0484* (2013.01); *G06F 8/34* (2013.01); *A63F 2300/6009* (2013.01)

(58) Field of Classification Search
  None
  See application file for complete search history.

(56) References Cited

U.S. PATENT DOCUMENTS

| 2009/0249340 A1 | 10/2009 | Akiyama et al. |
| 2010/0144430 A1 | 6/2010 | Graham et al. |
| 2010/0144443 A1 | 6/2010 | Graham et al. |

(Continued)

FOREIGN PATENT DOCUMENTS

| JP | 2009-245285 | 10/2009 |
| JP | 2010-148869 | 7/2010 |
| JP | 2016-012306 | 1/2016 |

OTHER PUBLICATIONS

Office Action dated Jul. 30, 2019 in corresponding Japanese Application No. 2016-250181 (with translation), 9 pages.

(Continued)

*Primary Examiner* — Damon J Pierce
(74) *Attorney, Agent, or Firm* — Nixon & Vanderhye PC

(57) ABSTRACT

A game development system includes a server and at least one game development terminal. The server includes a game data storage unit that stores game data, and a task storage unit that stores a task to be carried out by a game developer on the game data in association with that game data. Each game development terminal includes at least one processor, at least one computer-readable storage medium, a game development program stored in the storage medium and configured to be executed by the processor, a communication unit that communicates with the server, and a display unit.

20 Claims, 11 Drawing Sheets

(56) References Cited

U.S. PATENT DOCUMENTS

| | | |
|---|---|---|
| 2010/0144444 A1 | 6/2010 | Graham |
| 2010/0146060 A1 | 6/2010 | Graham |
| 2011/0209117 A1* | 8/2011 | Agustin .................. A63F 13/60 717/109 |
| 2015/0057078 A1 | 2/2015 | Moore |
| 2015/0314199 A1* | 11/2015 | Chapman ................. G06F 8/71 463/42 |
| 2018/0178127 A1 | 6/2018 | Okamura |

OTHER PUBLICATIONS

Notice of Refusal dated Sep. 26, 2019 in JP Application No. 2016-250181 (with English language translation), 7 pages.

Hidekazu Takahashi, "Now! The Free Software of the Supreme Court," a game development environment rich in material, Nikkei Linux, Nikkei BP, Oct. 8, 2015, vol. 17, No. 11, pp. 13-15, 5 pages.

[Xuni:FlexGrid] "Method for changing the text to be displayed in group header when grouped," Knowledgebase [online], GrapeCity, Oct. 3, 2016 [Searched on Sep. 26, 2019], the Internet <URL: https://dev.grapecity.co.jp/support/kb/detail.asp?id=81820> (documents showing well-known arts), 3 pages.

Hideo Harada, "County! C #& VB Complete Application, Nikkei Software," Nikkei BP, Sep. 24, 2013, vol. 16, No. 11, pp. 078 to 095 (documents showing well-known arts), 21 pages.

* cited by examiner

GAME DEVELOPMENT SYSTEM

CROSS-REFERENCE TO RELATED APPLICATIONS

This application is a continuation of application Ser. No. 15/699,073 filed Sep. 8, 2017, which claims priority to JP Patent Application No. 2016-250181 filed Dec. 22, 2016, the entire contents of each of which are hereby incorporated by reference.

TECHNICAL FIELD

The present invention relates to a game development system, a game development method, a game development terminal, and a game development program.

BACKGROUND ART

When developing a game, it is necessary to create a large amount of game data. To that end, game development tools such as Unity (https://unity3d.com/jp/unity) are used.

SUMMARY OF THE INVENTION

A development administrator is typically set for each instance of game data, and that administrator oversees the development of the corresponding game data. During such development, other game developers overseeing related game data, testers who check the game during development, and so on may request tasks such as correcting the game data be carried out.

However, there is a problem in that there are large amounts of game data, and thus associating the data with tasks is not easy. Game data is also diverse, and there is game data related to characters such as people as well as objects such as boulders in backgrounds appearing in game screens. However, such objects are often not given names that make the objects distinguishable from each other, and there is thus a risk of being unable to confirm which object game data a task that has been ordered pertains to. There is thus a risk that an ordered task will be left without being carried out, or that the task will be lost track of.

Having been conceived in order to solve this problem, an object of the present invention is to provide a game development system, a game development method, a game development terminal, and a game development program that can reliably specify the game data to which an ordered task pertains, and that enables game development to be carried out efficiently.

A game development system according to a first aspect includes a server and at least one game development terminal. The server includes a game data storage unit that stores one or more instances of game data, and a task storage unit that stores a task to be carried out by a game developer on the game data in association with that game data. Each of the game development terminals includes at least one processor, at least one memory, at least one storage unit, a communication unit that communicates with the server, a display unit, a browsing processing module including a game data browsing processing module and a task browsing processing module, the game data browsing processing module causing a list of the game data stored in the game data storage unit to be displayed in the display unit in response to an instruction operation made by an operator operating the game development terminal, and the task browsing processing module causing a list of the tasks to be displayed in the display unit; a game data editing module that creates new game data or edits the game data selected from the list in response to an instruction operation made by the operator; a game data updating module that updates and stores the game data created or edited by the game data editing module in the game data storage unit in response to an instruction operation made by the operator; and a task creation module that creates a task for the selected game data and stores the task in the task storage unit in response to an instruction operation made by the operator. The browsing processing module furthermore causes, in the case where one of the tasks stored in the task storage unit has been selected on the basis of an instruction operation made by the operator, the game data associated with that task to be displayed; and causes, in the case where game data has been selected, the tasks associated with that game data to be displayed.

According to this aspect, tasks associated with each instance of game data are created, and the tasks are stored in the task storage unit. As such, the game data and the tasks can be reliably associated with each other. This makes it possible to prevent tasks from being lost track of, left without being carried out, and so on. Additionally, the tasks are associated with the game data regardless of the names of the game data, and thus it is possible to browse tasks from the game data, or browse game data from the tasks.

Note that a variety of forms are possible for the display unit of the game development terminal. For example, the display unit may be constituted of an LCD or the like provided in the game development terminal; or, the game development terminal may be provided with a gave device that executes the game program under development, and the display unit may be constituted of an LCD or the like provided integrally with the game device.

The game data also includes a game program for executing the game. Accordingly, tasks can also be associated with the game program.

A game development system according to a second aspect is the game development system according to the first aspect, wherein the game development terminal further includes: a game processing execution unit that causes a game image to be displayed in the display unit by obtaining the game data, including a game program, from the game data storage unit and executing game processing on the basis of the game program; and an object selection module that selects an object present in the game image displayed in the display unit on the basis of an instruction operation made by the operator, and wherein the task creation module creates the task in association with the game data pertaining to the object selected by the object selection module.

According to this aspect, an object present in the game image can be selected, and a task can be created for the game data pertaining to that object, from the game image. Tasks can therefore be created more efficiently, while visually confirming the object, as compared to a situation in which tasks are created from the list of game data.

Note that because a variety of forms are possible for the display unit of the game development terminal as described above, the game image can be displayed in any of the above-described display units.

A game development system according to a third aspect is the game development system according to the above-described first or second aspects, wherein an administrator is set for each instance of the game data, and the task browsing processing module displays, in the display unit, a list of the tasks associated with the game data for which the game developer is set as the administrator.

According to this aspect, each game developer can easily see the tasks for which he or she has received an order.

A game development system according to a fourth aspect is the game development system according to any one of the above-described first to third aspects, wherein the server further includes a progress management information storage unit that stores progress management information associated with each instance of the game data, and the game development terminal further includes a progress management information updating module that updates the progress management information in response to an instruction operation made by the operator.

According to this aspect, progress management information pertaining to the development of the game data is stored, and thus the game developer can confirm the progress of the development of each instance of game data. Additionally, the progress management information is updated and stored in response to an instruction made by the game developer, and thus other game developers, for example, can always see the latest progress management information.

A game development system according to a fifth aspect is the game development system according to any one of the above-described first to fourth aspects, wherein the game data browsing processing module displays a quantity of tasks to be carried out for the game data included in the list as a number in a position corresponding to a name of the game data.

According to this aspect, the number of tasks ordered for each instance of game data is displayed in the game data list, and thus the game developer can easily see how many tasks have been ordered for a given instance of the game data.

Note that in addition to a specific name, the "name" of the game data includes, for example, an ID specified by a number. That is, the "name" may be any information by which the game data can be identified. As long as the game data can be identified from objects pertaining to that game data, classifications of objects higher in a hierarchical structure, or the like, the names of the game data may overlap as well. This also applies to the names of objects described below.

A game development system according to a sixth aspect is the game development system according to the above-described fifth aspect, wherein the game data browsing processing module displays a name of an object appearing in the game in a hierarchical structure in accordance with an attribute of the object, and displays the name of the game data corresponding to the object in a lower part of the hierarchical structure; and furthermore displays a total number of tasks to be carried out on all instances of the game data below the object in the hierarchical structure, in a position corresponding to the name of the object.

According to this aspect, the total number of tasks below each classification of an object indicated in the hierarchical structure is indicated for each of those classifications. Accordingly, the total number of tasks for each object in the hierarchical structure can be easily seen in addition to the number of tasks in each instance of the game data.

A game development system according to a seventh aspect of the invention includes a server and at least one game development terminal. The server includes at least one processor, at least one memory, a game data storage unit that stores one or more instances of game data, and a task storage unit that stores a task to be carried out by a game developer on the game data in association with that game data. Each of the game development terminals includes a communication unit that communicates with the server, and a display unit.

The server further includes: a browsing processing module including a game data browsing processing module and a task browsing processing module, the game data browsing processing module causing a list of the game data stored in the game data storage unit to be displayed in the display unit in response to an instruction operation made by an operator operating the game development terminal, and the task browsing processing module causing a list of the tasks to be displayed in the display unit; a game data editing module that creates new game data or edits the game data selected from the list in response to an instruction operation made by the operator; a game data updating module that updates and stores the game data created or edited by the game data editing module in the game data storage unit in response to an instruction operation made by the operator; and a task creation module that creates a task for the selected game data and stores the task in the task storage unit in response to an instruction operation made by the operator. The browsing processing module furthermore causes, in the case where one of the tasks stored in the task storage unit has been selected on the basis of an instruction operation made by the operator, the game data associated with that task to be displayed; and causes, in the case where game data has been selected, the tasks associated with that game data to be displayed.

According to this aspect, tasks associated with each instance of game data are created, and the tasks are stored in the task storage unit. As such, the game data and the tasks can be reliably associated with each other. This makes it possible to prevent tasks from being lost track of, left without being carried out, and so on. Additionally, the tasks are associated with the game data regardless of the names of the game data, and thus it is possible to browse tasks from the game data, or browse game data from the tasks. Furthermore, the editing of game data, the creation of tasks, and so on are carried out in the server, which makes it possible to lighten the load on the game development terminal.

A game development method according to an eighth aspect is a game development method carried out in a system including a server and a game development terminal that can communicate with the server. The method includes: a step of causing a list of game data stored in the server to be displayed in the game development terminal in response to an instruction operation made by an operator operating the game development terminal; a step of causing a list of tasks to be displayed in the game development terminal; a step of creating new game data or editing the game data selected from the list of the game data in response to an instruction operation made by the operator; a step of updating and storing the created or edited game data in the server in response to an instruction operation made by the operator; a step of creating a task for the selected game data and storing the task in the server in response to an instruction operation made by the operator; a step of causing, in the case where one of the tasks stored in the server has been selected in the game development terminal on the basis of an instruction operation made by the operator, the game data associated with that task to be displayed; and a step of causing, in the case where an instance of the game data stored in the server has been selected in the game development terminal on the basis of an instruction operation made by the operator, the tasks associated with that game data to be displayed.

Note that the above-described steps do not absolutely need to be executed in the order written, and the order of execution can be changed as appropriate.

A game development terminal according to a ninth aspect is a game development terminal that can communicate with a server, the server storing game data and tasks that are carried out by a game developer on the game data and associated with that game data. The terminal includes at least one processor, at least one memory, at least one storage unit, a communication unit that communicates with the server, and a display unit, a browsing processing module including a game data browsing processing module and a task browsing processing module, the game data browsing processing module causing a list of the game data stored in the server to be displayed in the display unit in response to an instruction operation made by an operator operating the game development terminal, and the task browsing processing module causing a list of the tasks to be displayed in the display unit; a game data editing module that creates new game data or edits the game data selected from the list in response to an instruction operation made by the operator; a game data updating module that updates and stores the game data created or edited by the game data editing module in the game data storage unit in response to an instruction operation made by the operator; and a task creation module that creates a task for the selected game data and stores the task in the task storage unit in response to an instruction operation made by the operator. The browsing processing module furthermore causes, in the case where one of the tasks stored in the server has been selected on the basis of an instruction operation made by the operator, the game data associated with that task to be displayed; and causes, in the case where game data has been selected on the basis of an instruction operation made by the operator, the tasks associated with that game data to be displayed.

A game development program according to a tenth aspect is a game development program executed by a computer of a game development terminal that can communicate with a server, the server storing game data and tasks that are carried out by a game developer on the game data and associated with that game data. The program causing the computer to execute: a step of causing a list of the game data stored in the server to be displayed in response to an instruction operation made by an operator operating the game development terminal; a step of causing a list of the tasks stored in the server to be displayed in response to an instruction operation made by the operator; a step of creating a task for the selected game data and storing the task in the server in response to an instruction operation made by the operator; a step of causing, in the case where one of the tasks stored in the server has been selected on the basis of an instruction operation made by the operator, the game data associated with that task to be displayed; and a step of causing, in the case where game data has been selected on the basis of an instruction operation made by the operator, the tasks associated with that game data to be displayed.

Note that the above-described steps do not absolutely need to be executed in the order written, and the order of execution can be changed as appropriate.

EMBODIMENTS OF THE INVENTION

Figure 1:
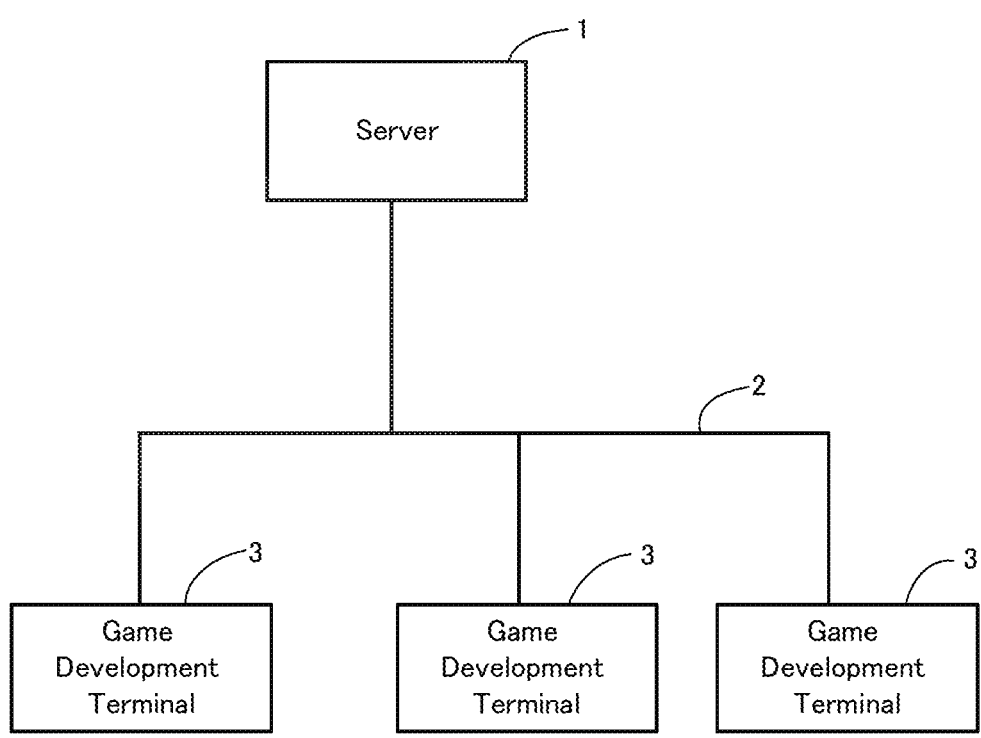
FIG. 1 is a block diagram illustrating an embodiment of a game development system according to the present invention.

An embodiment of game development system according to the present invention will be described hereinafter with reference to the drawings. FIG. 1 is a block diagram illustrating the game development system.

1. Game Development System

As illustrated in FIG. 1, the game development system according to the present embodiment includes a server 1 storing various types of data such as game programs and the like, and a plurality of game development terminals 3 capable of communicating with the server 1 over a network 2. Aside from the internet, the network 2 may be an intranet at a development business, or a private network for communicating with an external associated company, for example. In the system, a game developer develops a game using the game development terminal 3. At this time, the necessary game data and the like is downloaded from the server 1, and various development tasks such as editing the game data are then carried out. Once the development tasks are complete, the game data is sent to the server 1 so as to update the game data. A developer can use the game development terminal 3 to order tasks to be carried out by him/herself or another game developer. In addition to the game developer who carries out development tasks such as the creation and editing of game data, a tester who checks the game and so on can also use the game development terminal 3, and can order tasks to be carried out. A person who orders a task using the game development terminal 3 will be referred to hereinafter as an "ordering party". A person who operates the game development terminal 3 in any way, including ordering tasks, will be referred to hereinafter as an "operator". The server 1 and the game development terminal 3 will be described in detail below.

2. Server

Figure 2:
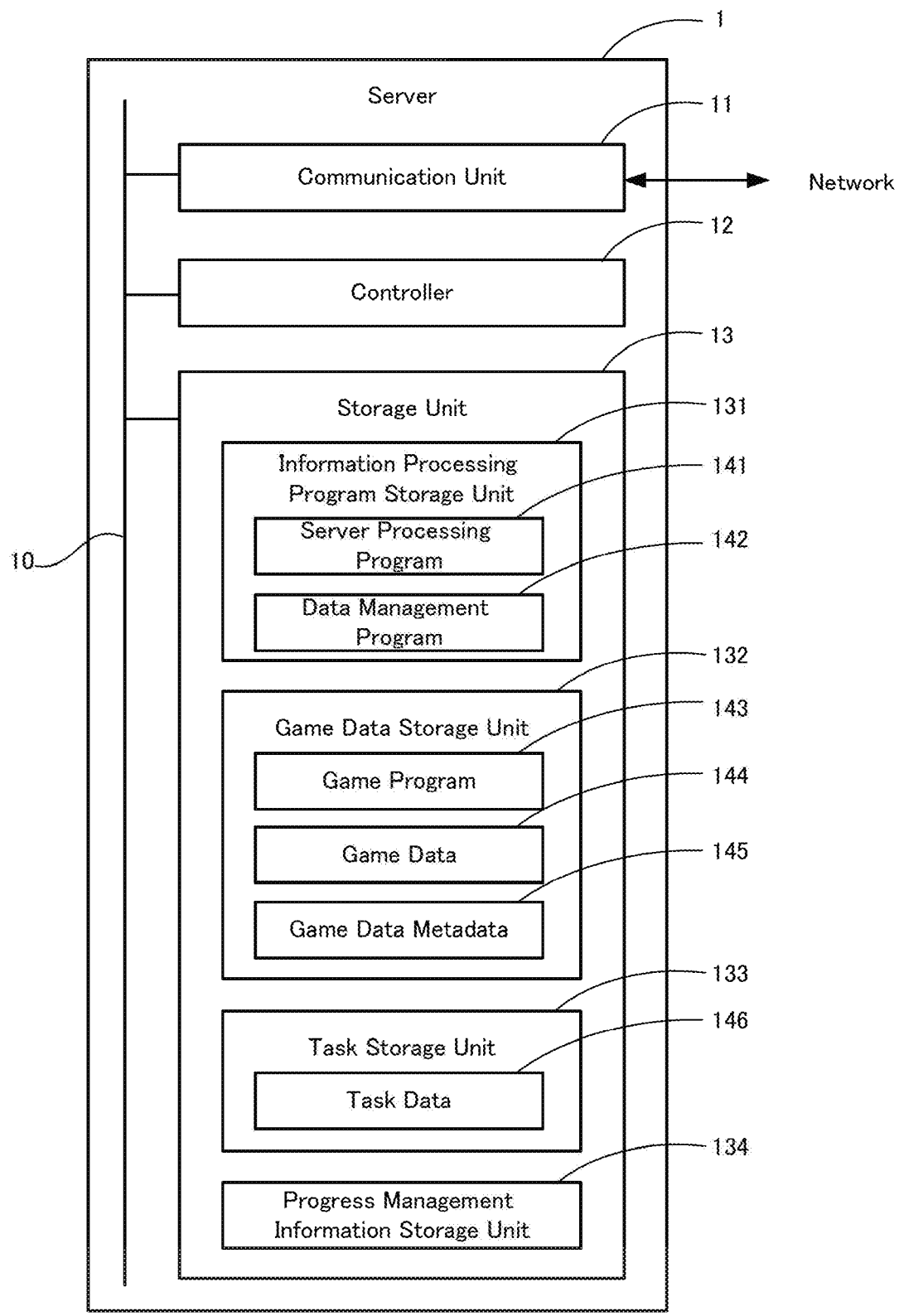
FIG. 2 is a block diagram illustrating the configuration of a server illustrated in FIG. 1.

First, the server 1 will be described with reference to FIG. 2. FIG. 2 is a block diagram illustrating an example of the configuration of the server 1 according to the present embodiment.

As illustrated in FIG. 2, the server 1 includes a communication unit 11, a controller 12, and a storage unit 13 connected to each other by a bus 10. The communication unit 11 is constituted of a predetermined communication module, and exchanges data with the game development terminal 3 over the network 2.

The controller 12 is constituted primarily of a CPU, RAM, ROM, and so on. Various types of information processing are carried out by the controller 12 executing programs stored in the storage unit 13. Exchanging data with the game development terminals 3, editing game data, including updating the game data, and so on can be given as examples of the information processing carried out by the controller 12. However, the information processing is not limited thereto, and also includes general information processing carried out for operating as the server 1.

The storage unit 13 can be constituted of a known storage device such as an HDD, an SSD, or the like, and includes an information processing program storage unit 131 storing programs and the like pertaining to the operation of the server 1, a game data storage unit 132 storing a game program 143 and the like, a task storage unit 133 storing task data 146 for managing tasks (described later), and a progress management information storage unit 134 storing progress management information pertaining to the development of each instance of game data.

The information processing program storage unit 131 includes a server processing program 141 for operating the server 1, and a data management program 142 for managing game data 144, which will be described later. The game data storage unit 132 contains a game program 143 under development, the game data 144 used for that game, metadata 145 of the game data, and so on. In addition to game data directly used in the game, the game data 144 also includes data for creating the game data. The metadata 145 includes data connections, progress IDs, and so on. The task storage unit 133 contains the task data 146 pertaining to tasks to be carried out by a developer. Development tools are also included in the game executed using the game program 143. For example, game data belonging to objects can be displayed, as will be described later.

The server 1 can also include input units such as a keyboard, a mouse, a touch panel, and the like as interfaces for a server administrator to make inputs, a display, an output unit such as a printer, and so on.

A predetermined login process can be carried out when exchanging data with the server 1 over the network 2. In this case, an authentication process that determines whether or not a user attempting to log into the server 1 is a registered user may be carried out, or an authentication process that determines whether or not the game development terminal 3 attempting to connect to the server 1 is registered may be carried out.

Additionally, the server 1 can be constituted of a single device, or can be constituted of a plurality of devices. For example, the server can be constituted of two devices, with the information processing program storage unit 131 and the game data storage unit 132 provided in one of the devices and the task storage unit 133 provided in the other of the devices. The configuration can also be implemented such that the above-described constituent elements are spread among a plurality of devices.

3. Game Development Terminal

Figure 3:
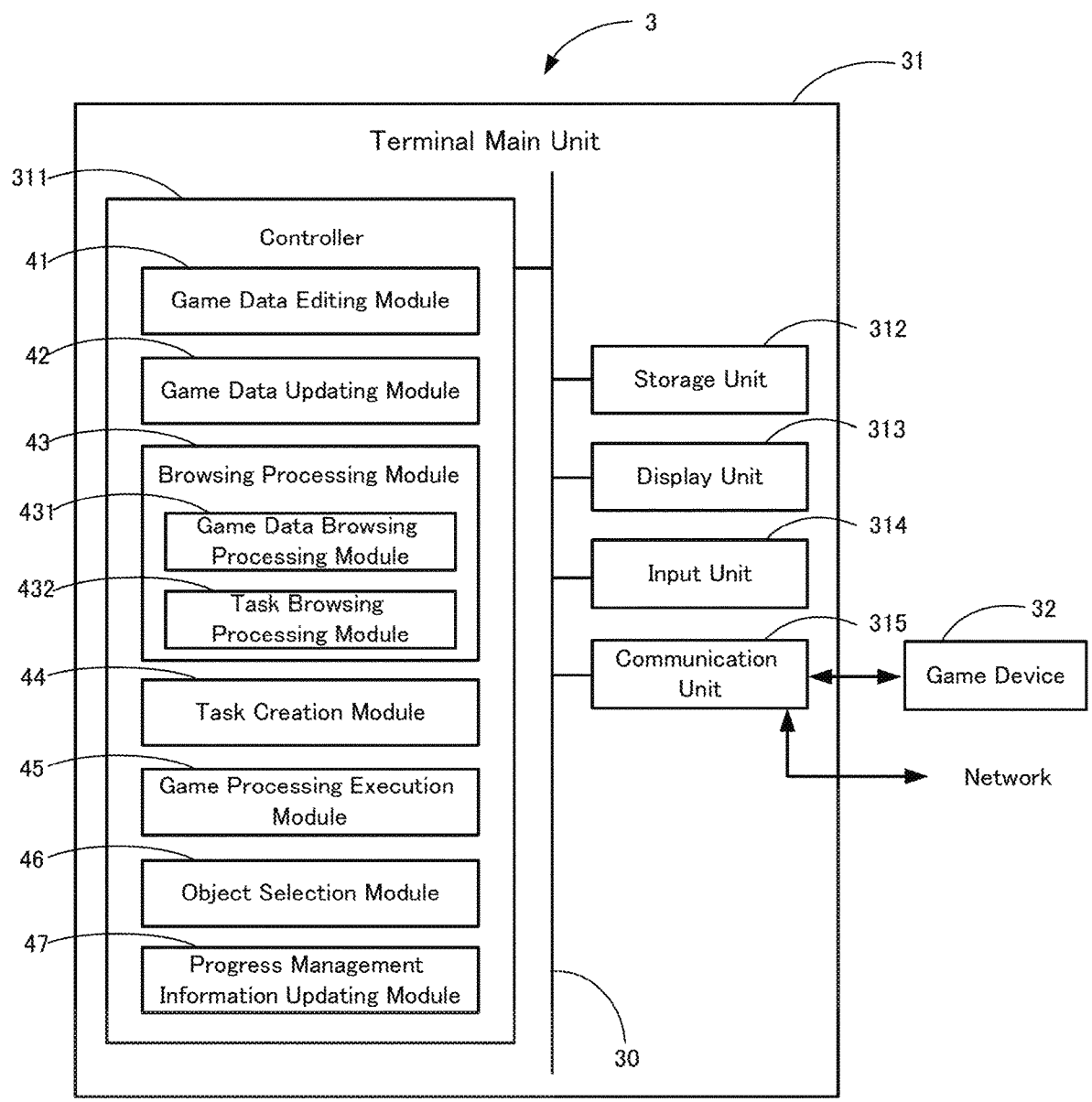
FIG. 3 is a block diagram illustrating the configuration of a game development terminal illustrated in FIG. 1.

Next, the game development terminal 3 will be described with reference to FIG. 3. FIG. 3 is a block diagram illustrating an example of the configuration of the game development terminal 3 according to the present embodiment.

As illustrated in FIG. 3, the game development terminal 3 includes a terminal main unit 31, and a game device 32 that is connected to the terminal main unit 31 and that executes the game being developed.

The terminal main unit 31 will be described first. As illustrated in FIG. 3, the terminal main unit 31 can be constituted by a known personal computer, for example. The terminal main unit 31 includes a controller 311, a storage unit 312, a display unit 313, an input unit 314, and a communication unit 315, which are connected to each other by a bus 30.

The controller 311 is constituted primarily of a CPU, RAM, ROM, and so on. The storage unit 312 can be constituted of a known storage device such as an HDD, an SSD, or the like, and stores various types of data used by the controller 311 to carry out the above-described game development. For example, various types of data downloaded from the above-described server 1, such as the data management program 142, the game program 143, and the game data 144, are stored in the storage unit 312.

By executing the data management program 142 stored in the storage unit 312, the controller 311 functions virtually as a game data editing module 41, a game data updating module 42, a browsing processing module 43, a task creation module 44, a game process execution module 45, an object selection module 46, and a progress management information updating module 47. The browsing processing module 43 includes a game data browsing processing module 431 and a task browsing processing module 432. These functional configurations will be described later.

The display unit 313 is constituted by a display device such as an LCD, and displays images in accordance with instructions from the controller 311. In the case where the terminal main unit 31 is constituted by a personal computer, for example, the display unit 313 may be a unit that is separate from the terminal main unit 31.

The input unit 314 may be any input device that can be operated by an operator such as a game developer, a person ordering tasks, or the like, and can be constituted by a keyboard, a mouse, a touch panel, or the like. In the present embodiment, it is assumed that, for example, an operation for pressing a button or the like displayed in the display unit 313 is carried out using a mouse.

The communication unit 315 is constituted of a predetermined communication module, and exchanges data with the server 1 over the network 2.

The game device 32 is a dedicated game device that executes the game being developed, and is a stationary or mobile game device. In the case of a stationary game device, a display device such as an LCD is provided separately. However, in the case of a mobile game device, a display unit is integrated into the game device. However, no particular distinction is made between the two in the present embodiment, and a device that displays game images in the game device 32 is simply referred to as a "display unit". Furthermore, the game device 32 is provided with an input unit for making operations pertaining to the game. Note that the game device 32 may be provided as a unit separate from the terminal main unit 31, or may be included in the terminal main unit 31.

4. Game Development Process

A game development method using the above-described server 1 and game development terminal 3 will be described next. First, a game developer downloads data pertaining to game development, such as the data management program 142, the game program 143, and the game data 144, from the server 1, and executes those programs in the game development terminal 3. The data management program 142 differs from the game data 144 and so on in that the data management program 142 is not updated frequently as the game is being developed, and thus does not necessarily need to be downloaded each time. Accordingly, the data management program 142 may be downloaded once and stored in the game development terminal 3, or may be stored in the game development terminal 3 in advance. Next, a data management screen used to develop the game will be described, after which an overview of the game development and the management of tasks will be described.

4-1. Data Management Screen

Figure 4:
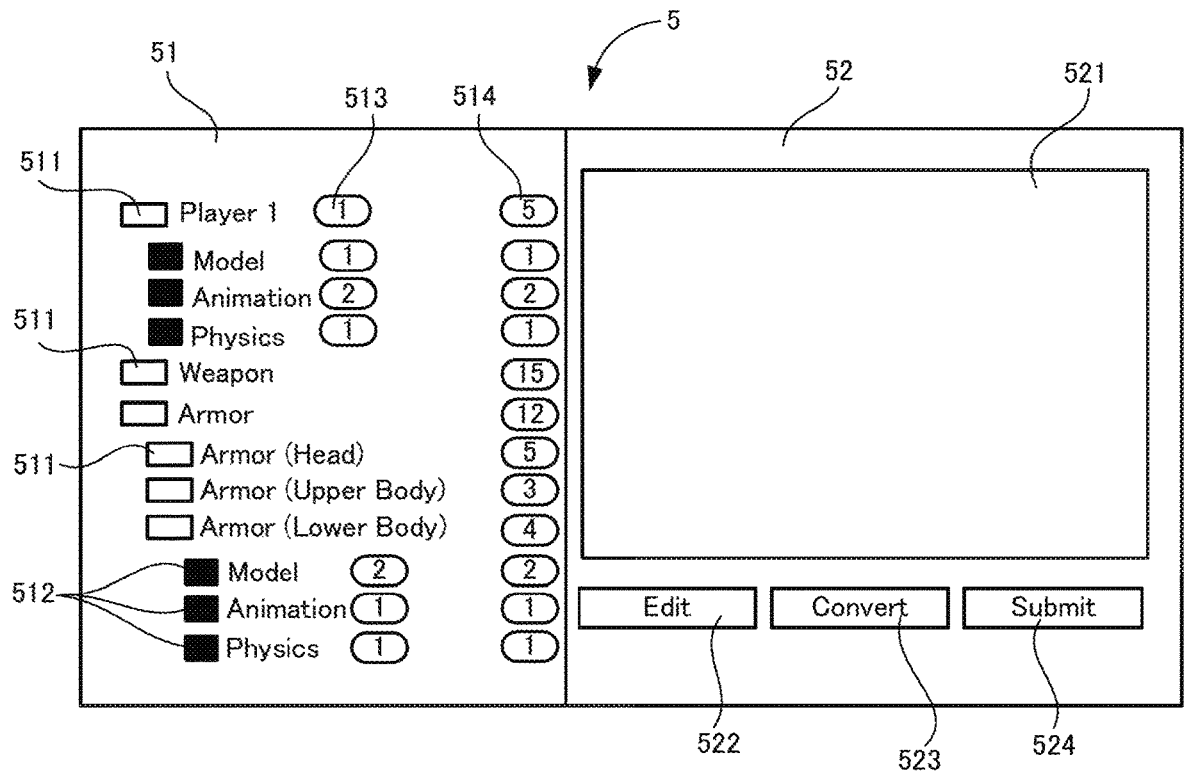
FIG. 4 is a diagram illustrating a data management screen.

FIG. 4 is a data management screen displayed when the data management program 142 is executed. As described above, when the data management program 142 is executed, a data management screen 5 is displayed in the display unit 313 of the game development terminal 3. The game data can be edited using the data management screen 5. As illustrated in FIG. 4, the data management screen 5 is divided into two regions on the left and right. A first region 51 displaying a list of game data is displayed on the left side, and a second region 52 in which the game data is edited is displayed on the right side.

A list of objects appearing in the game and game data pertaining to those objects is displayed in the first region 51. This list is created by the game data browsing processing module 431 of the controller 311 on the basis of the downloaded game data 144.

The "objects" displayed in this list referred to the various elements constituting the game. These include characters appearing the game, such as people, animals, monsters, and so on; items, weapons, and so on to be carried by characters; structures such as buildings; natural features such as mountains, lakes, and boulders; and the like. In addition to objects having specific shapes, events occurring in the game (for example, battle scenes, riots, and so on) also serve as objects. Such objects are classified into a hierarchical structure and displayed in the first region 51.

In the example illustrated in FIG. 4, a character "player 1", "weapon", and "armor" are displayed as classes of objects higher in the hierarchical structure. "Head", "upper body", and "lower body" are displayed as classifications of armor lower in the hierarchical structure. The lowest classification corresponds to the specific object, and game data is provided for these objects. For example, three instances of game data, namely "model", "animation", and "physics", are provided for the player 1. "Model" is data expressing the shape and so on of the object, whereas "animation" is data for animating the object expressed by the model. "Physics" is data primarily expressing the physical properties of the object, and expresses a weight, a velocity, and so on, for example. However, the game data is not limited thereto, and can be set as appropriate in accordance with the object.

In the example illustrated in FIG. 4, object classifications that are lower in the hierarchical structure or objects having game data have a rectangular white classification icon 511 displayed on the left side of the classification, the name of the object, or the like. Meanwhile, a rectangular black game data icon 512 is displayed on the left side of the name of the game data. Classifications, game data, and so on lower in the hierarchical structure than a classification for which the classification icon 511 is displayed can also be hidden. For example, classifications, game data, and so on lower in the hierarchical structure than the classification of "weapon" in FIG. 4 are not displayed, but those classifications, game data, and so on lower in the hierarchical structure can be displayed by pressing the classification icon 511.

The display method for the list indicated in the first region 51 can be changed as appropriate according to the type of the object. In other words, although FIG. 4 illustrates a hierarchical structure based primarily on characters, weapons, tools, and so on being displayed, for example, a hierarchical structure based on events, which are another type of object, can also be displayed. In other words, by pressing a display selection button (not illustrated), events can be displayed according to a hierarchical structure in a fragmented manner. Related characters can also be displayed in that hierarchical structure, and thus game data is displayed along with the objects in the same manner as illustrated in FIG. 4.

Figure 5:
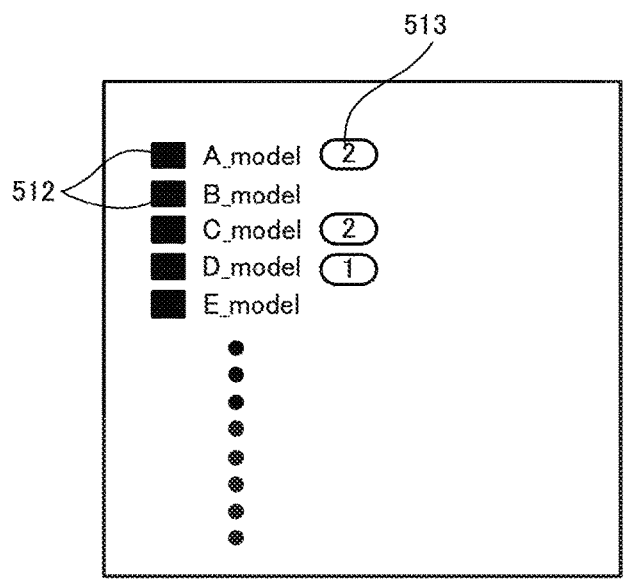
FIG. 5 is a diagram illustrating a screen in which game data has been extracted and listed.

Various types of game data can also be extracted from this list. For example, as illustrated in FIG. 5, a list can be created by extracting only the game data pertaining to models, and that list can then be displayed in the first region 51. Lists can therefore be created not only on the basis of objects, but also on the basis of game data types. Note that such a list is not limited to being displayed in the first region 51. A window separate from the first region 51 can be displayed, and the lists can then be displayed in that window.

One or more game developers is assigned as an administrator for each instance of game data. Progress leading to the completion of the game data is also set.

As illustrated in FIG. 4, in the list displayed in the first region 51, numbers are indicated to the right of the classifications, game data names, and so on. These numbers will be called task numbers 513 hereinafter. The task numbers 513 are numbers indicating tasks to be carried out by the game developer with respect to each instance of game data, objects, and classifications of objects at the top of the hierarchical structure. The task numbers 513 include tasks to be carried out by other game developers in addition to the tasks to be carried out by the game developer operating the game development terminal 3.

Task numbers 514 corresponding to the classifications, objects, and game data are also indicated on the right end side of the first region 51. The task numbers 514 indicate the total number of all of the tasks lower in the hierarchical structure than that classification or the like. These will be called "total task numbers 514". For example, in the example illustrated in FIG. 4, the total task number 514 corresponding to the "armor" classification is 12, and this represents the total of all of the task numbers 513 included in the armor classification. In other words, there are task numbers 513 of 5, 3, and 4 for the armor (head), armor (upper body), and armor (lower body) classifications, respectively, and thus the total task number 514 of 12 for "armor" is the total thereof. Additionally, three instances of game data are indicated for the classifications lower in the hierarchical structure than the armor (lower body) classification, and there are task numbers 513 of 2, 1, and 1 for those respective instances of game data, and thus the total task number for the armor (lower body) classification is 4.

In this manner, the task numbers 513 and 514 are indicated for each instance of game data, each object, and each object classification in the list displayed in the first region 51. Accordingly, the game developer can easily see the objects, classifications thereof, and so on for which tasks are to be carried out, and can also easily see the number of tasks to be carried out. Note that the task number display is the same for the list illustrated in FIG. 5 as well.

The second region 52 will be described next. As illustrated in FIG. 4, the second region 52 displays tools for editing the game data. Specifically, an editing screen 521, an edit button 522, a convert button 523, and a submit button 524 are arranged here. A game data editing method will be described in detail later.

4-2. Game Data Editing

Figure 6:
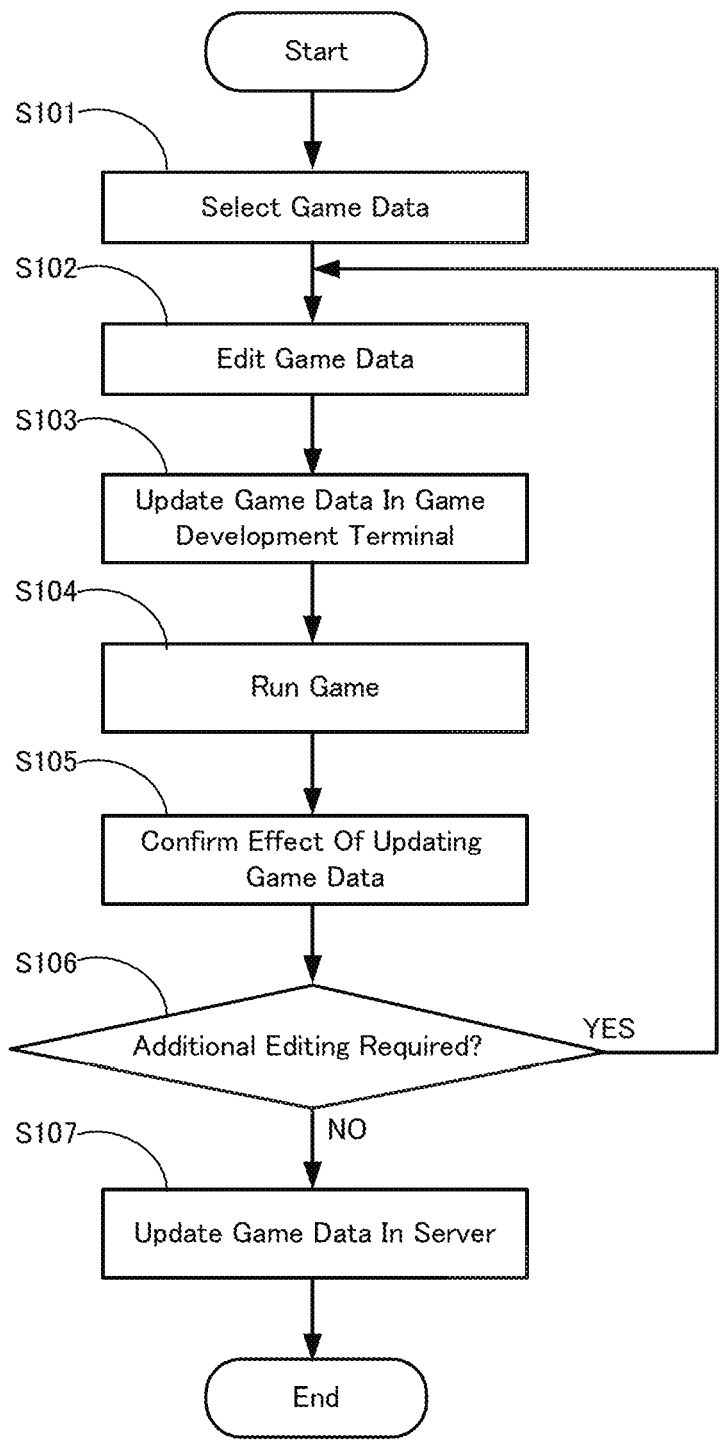
FIG. 6 is a flowchart illustrating a game data editing process.

Next, the editing of the game data will be described with reference to the flowchart in FIG. 6. First, the game data to be edited is selected from among the game data displayed in the first region 51 (step S101), and when the edit button 522 is then pressed, the editing screen 521 based on the selected game data is displayed in the second region 52.

For example, if "physics" game data for armor (upper body), which is an object displayed in the first region 51, is selected, parameters pertaining to that armor, such as a weight, are displayed in the editing screen 521. The game developer can then carry out editing tasks such as modifying, adding, and deleting parameters displayed in the editing screen 521 (step S102). An editing screen based on the selected game data is displayed in the editing screen 521 in this manner. Accordingly, in the case where other game data has been selected, the editing screen 521 is displayed having different parameters and so on from those displayed for armor (upper body). The foregoing editing tasks are carried out by the game data editing module 41 of the controller 311.

Depending on the type of the game data, a dedicated application may be launched. For example, in the case where "animation" has been selected as the game data, a dedicated application for editing animations is launched. In this case, the dedicated application can be launched, and a dedicated window separate from the editing screen 521 can be displayed in order to carry out the editing. A 3D model creation/editing application, an image processing application, and so on can also be employed as this type of dedicated application.

When the editing of the game data using the editing screen 521 or a dedicated application is complete, the game developer presses the convert button 523 to confirm the completion of the editing. The game data downloaded to the game development terminal 3 is updated in response to this operation (step S103). Next, the game program is executed in response to an instruction from the game developer, in order to confirm the effects of the updated game data. A game into which the updated game data has been incorporated is then started (step S104). In other words, a game screen is displayed in the display unit of the game device 32 provided in the game development terminal 3. The game developer then causes the objects pertaining to the edited game data to be displayed in order to confirm the effects of the editing (step S105). In the case where confirming the effects of the editing indicates that additional editing is necessary (YES in step S106), the game data is edited again in the manner indicated in steps S102 to S105. Although these processes are executed on the basis of instruction operations made by the game developer, processes not necessary in the editing tasks need not be instructed, and may not be executed. For example, in the case of a task where confirming the effects is unnecessary, the processes of steps S104 and S105 may be omitted.

In the case where the effects of the editing have been confirmed and the editing is complete (NO in step S106), the game developer presses the submit button 524. In response to this operation, the edited game data is applied to the game data 144 stored in the server 1 (step S107). In other words, the game data 144 stored in the server 1 is updated. Accordingly, all of the game development terminals 3 connected to the server 1 can view the updated game data 144 and the objects pertaining to the game data 144, and can also edit that data. The foregoing updating tasks are carried out by the game data updating module 42 of the controller 311. Note that it is only necessary to hold data, of the data used by the game developer, that is used in the game as the game data 144. Data necessary for the game developer to generate and edit game data but that is not used in the game, such as 3D model data having a higher level of detail than that used in the game, high-resolution textures, or data that was not employed but that may be used during corrections need not be held in the server 1, and may instead be held only in the game development terminal 3 used by the game developer.

4-3. Task Management

Task management will be described next. "Task" refers to work that a game developer is to carry out for each instance of game data, and particularly refers to work for which an order is issued to an administrator of that instance of game data.

4-3-1. Task Management Screen

Figure 7:
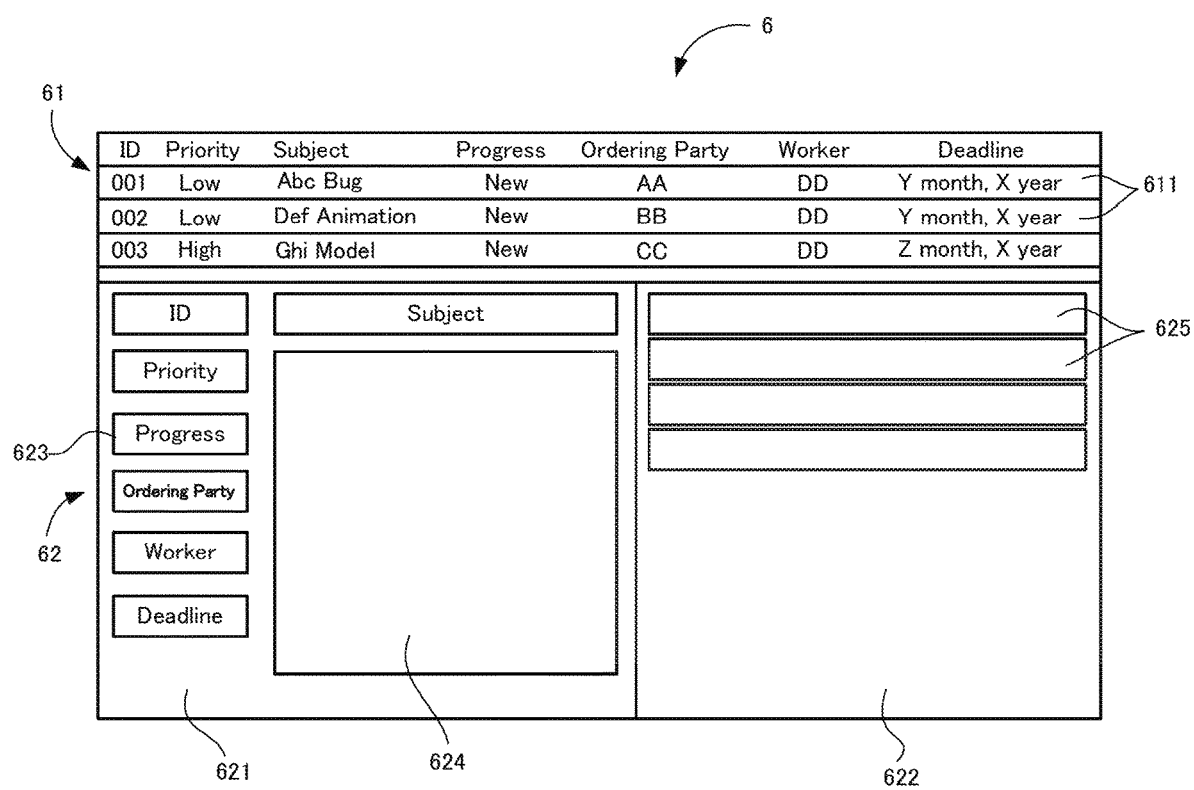
FIG. 7 is a diagram illustrating a task management screen.

First, the management of tasks to be carried out by respective game developers will be described. FIG. 7 illustrates a task management screen, which can be launched from the data management screen 5 illustrated in FIG. 4 by pressing a predetermined button. At this time, the task browsing processing module 432 of the game development terminal 3 reads the newest task data 146 stored in the server 1 and displays a list of tasks in a task management screen 6.

As illustrated in FIG. 7, the task management screen 6 is divided into two regions, namely an upper region and a lower region. A task list 61 is displayed in the upper region, and task details 62 indicating individual tasks are displayed in the lower region.

The task list 61 is a list of tasks ordered by an ordering party, and tasks to be carried out by the game developer corresponding to this task management screen 6 are displayed in the list. Each of task displays 611 included in the task list 61 indicates a task ID, a priority, a subject, progress, the ordering party, the worker, an order date, a deadline, and so on. When one of the task displays 611 is selected, the specific task details 62 are displayed in the lower region.

The region in which the task details 62 are displayed is further divided into two regions, namely a left region and a right region. The region on the left is a first region 621, and the region on the right is a second region 622. Specific information pertaining to the task, such as the task ID, the priority, the name of the game data, the subject of the task, the progress, the ordering party, the worker, the game data administrator, the deadline, and so on are displayed in the first region 621. Of these, progress 623 is an item displaying a status such as new, in progress, retake, or complete (progress management information). A communication space 624 for writing comments to the ordering party of the task is displayed in the first region 621. This will be described later.

Meanwhile, a history of communication between the ordering party of the task and the order recipient is displayed in the second region 622. In other words, communication 625 such as details of the request written in the above-described communication space 624, responses from the task order recipient, and comments are displayed in chronological order. This will also be described later.

By browsing the task management screen 6, the game developer can confirm the tasks that he or she is to carry out. Additionally, the data management screen 5 displaying a list of the associated game data can also be displayed by pressing a predetermined button in the task management screen 6. Meanwhile, when game data is selected from the list displayed in the data management screen 5 and a predetermined button is pressed, the task management screen 6 associated with that game data can be displayed.

4-3-2. Task Order 1

Figure 8:
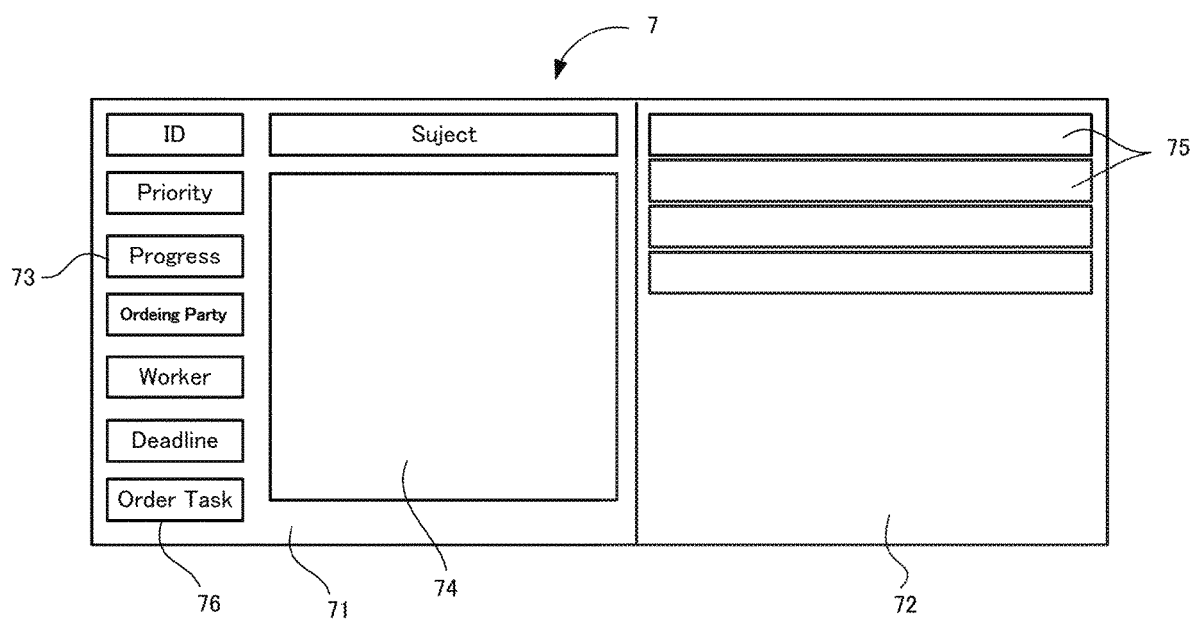
FIG. 8 is a diagram illustrating a task order screen.

Orders for tasks are issued to a game developer not only by other game developers, but also by parties responsible for various aspects of the development, such as testers who test the games. The orders for tasks can be made by operating the game development terminal 3. A system that automatically orders tasks on the basis of predetermined conditions may also be added, such that, for example, a task is automatically ordered from the system upon unexpected behavior or the like being detected in a display. In the case where a task is automatically generated, it is not necessary to carry out operations in the screen. The "ordering party" is assumed to include the entities that order a variety of tasks. As a general rule, all of the tasks for which orders are issued to other game developers by an ordering party are carried out at the game data level. First, desired game data is selected from the list displayed in the first region 51 of the above-described data management screen 5. In this state, a task order screen 7 illustrated in FIG. 8 is displayed upon a task creation button (not illustrated) being pressed. The content of the task order screen 7 is almost the same as the task details 62 in the lower part of the above-described task management screen 6. In other words, as described above, specific details of tasks, including progress 73, as well as a communication space 74, are displayed in a first region 71 on the left side of the task order screen 7. The ordering party writes the details of the task to be ordered in the space 74. The task details are varied, including work necessary for developing the game, such as character shapes, animation operations, changes in physical parameters, and so on, for which requests are issued to the other game developers.

A task order button 76 is displayed in the first region 71. When the various above-described items are entered and the order button 76 is pressed, the details of that task are sent to the server 1, and the task data 146 is updated. The task numbers 513 and 514 displayed in the data management screen 5 illustrated in FIG. 4 are also updated as a result of the task data 146 being updated. The content written in the communication space 74 is added in chronological order to the second region 622 of the task management screen 6 illustrated in FIG. 7 as the communication 625. The above-described processing is carried out by the task creation module 44 of the controller 311.

When, after the task data has been updated, the game developer who has received the order for the task launches the task management screen 6 from the data management screen 5 illustrated in FIG. 4, the task management screen 6 illustrated in FIG. 7, in which the newest tasks are indicated, is displayed. The game developer can therefore browse the updated task list 61. Then, when the game developer who ordered the task writes a response, a comment, or the like in the communication space 624 of the task management screen 6 and presses a "send" button (not illustrated), that content is sent to the server 1, and the task data 146 is updated. The content written in the communication space 624 is added in chronological order to the second region 622 in the same manner as described above. In this manner, the ordering party of a task and the order recipient of the task can communicate with each other through the details written in the communication space 624 until the task is completed. Additionally, the game developer can sequentially update the progress in the task management screen 6. Each time the progress is updated and the "send" button (not illustrated) is pressed, the progress management information updating module 47 of the controller 311 updates the progress management information stored in the progress management information storage unit 134 of the server 1.

Although it is preferable that tasks be ordered at the game data level, tasks can also be ordered at the level of objects containing the game data, object classifications higher in the hierarchical structure, and so on, in addition to the game data.

4-3-3. Task Order 2

Although the ordering of a task is carried out from the data management screen 5 in the foregoing descriptions, tasks can also be ordered from a game screen. This will be described below.

First, the game process execution module 45 of the controller 311 executes the game program in the game device 32 provided in the game development terminal 3, and runs the game. A game image is displayed in the display unit of the game device 32 as a result. The game run here is still under development, and thus game data associated with the objects displayed in each game image can also be displayed.

Figure 9:
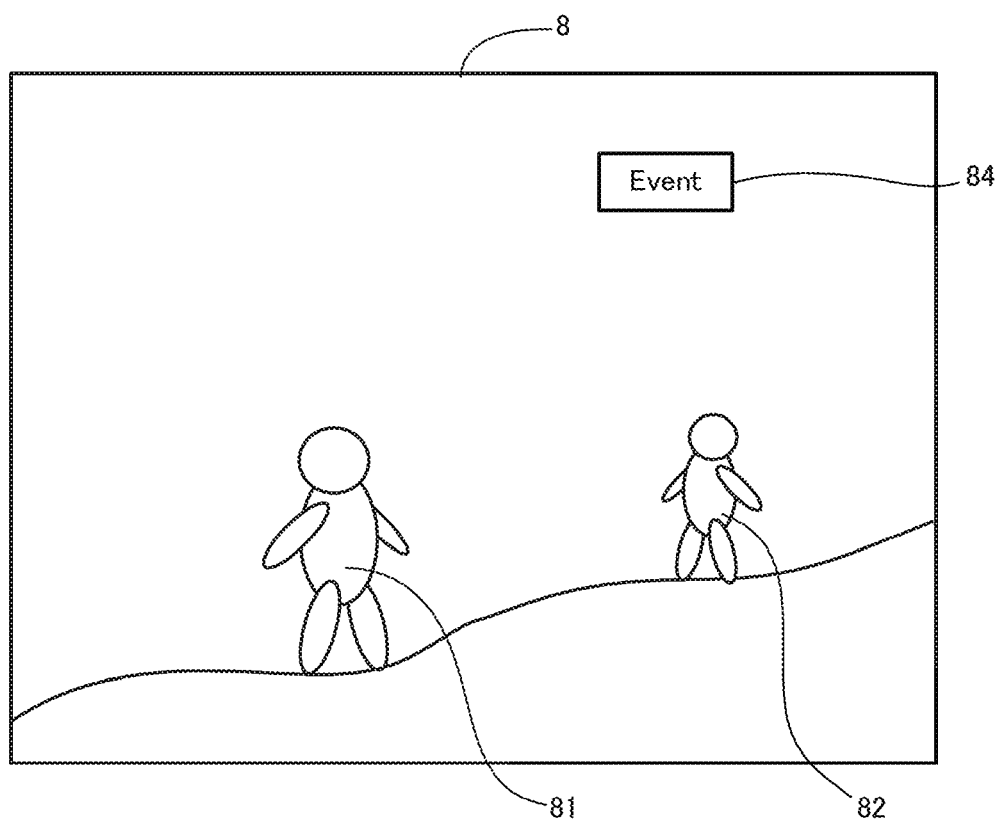
FIG. 9 is a diagram illustrating an example of a game image.
Figure 10:
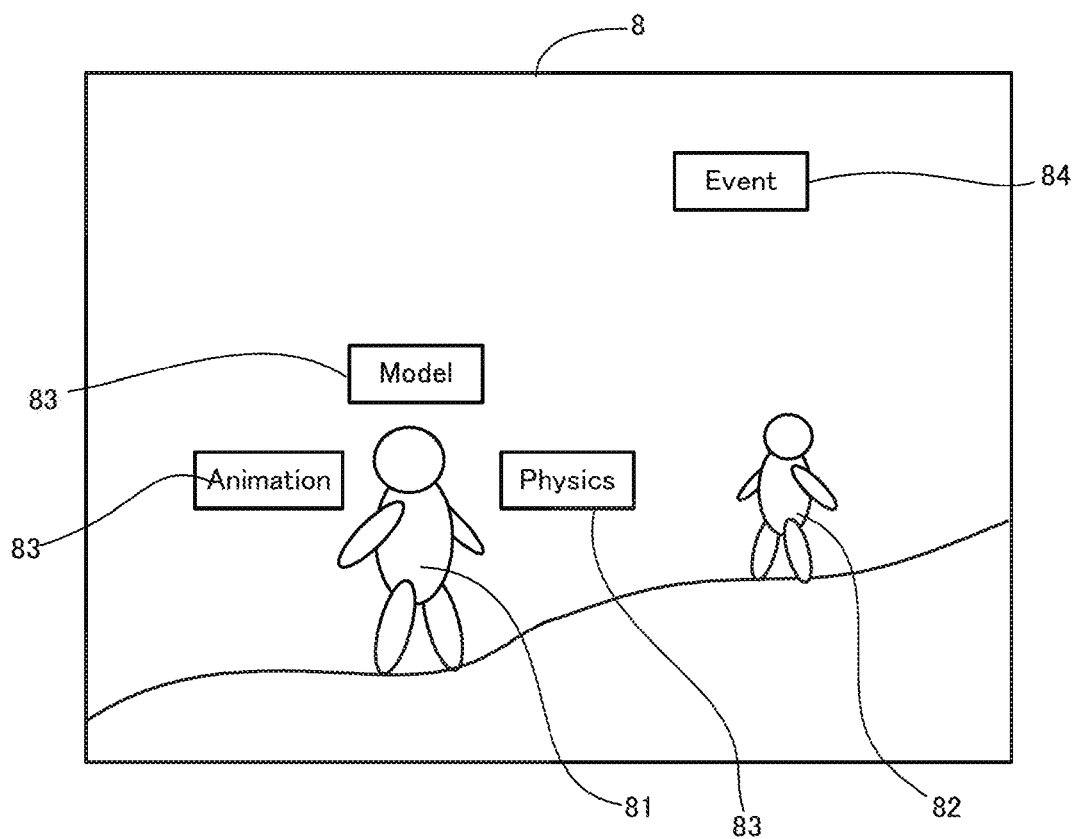
FIG. 10 is a diagram illustrating an example of game data in a game image.

For example, as illustrated in FIG. 9, when human character objects 81 and 82 are displayed in a game image 8, and the object 81 on the left side is clicked using the input unit of the game device 32, game data 83 pertaining to that object 81 is displayed in the game image 8, as illustrated in FIG. 10. When one of the instances of game data 83 is clicked, the task order screen 7 illustrated in FIG. 7 is displayed in the display unit 313 of the terminal main unit 31 of the game development terminal 3. The game developer can then order a task according to the procedure described above. The above-described processing is carried out by the object selection module 46 and the task creation module 44 of the controller 311.

Figure 11:
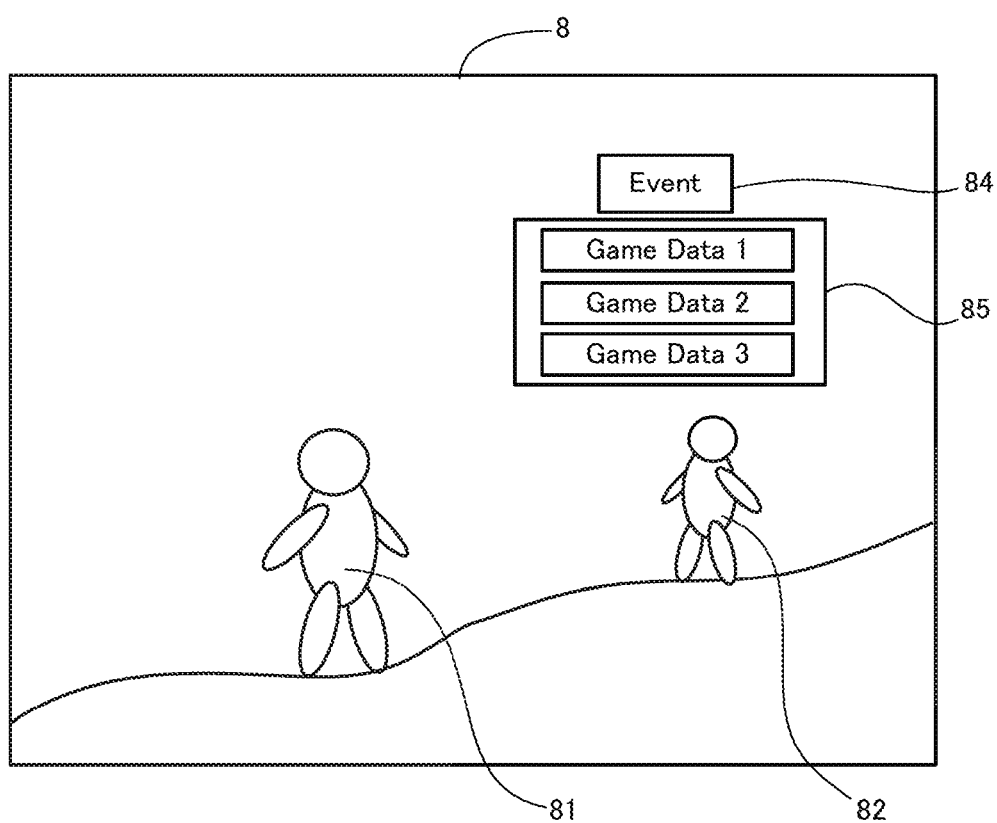
FIG. 11 is a diagram illustrating an example of game data pertaining to an event in a game image.

In addition to the selection of objects, tasks can also be ordered for game data pertaining to events occurring in each game image 8. For example, in the case where an event is occurring in the game image 8, an event button 84 is displayed, as illustrated in FIG. 9. When the event button 84 is pressed in the screen, a list 85 of game data pertaining to the event is displayed, as illustrated in FIG. 11. When one of the instances of game data is pressed in this list, the above-described task order screen 7 is displayed in the display unit 313 of the terminal main unit 31 of the game development terminal 3, in the same manner as described above. The ordering party can then order a task according to the procedure described above. In the case where there are a plurality of events, the plurality of events can be displayed and one of the events can then be selected.

4-3-4. Task Completion

When a game developer who has received a task order completes the task, that game developer can carry out an operation for changing the progress 623 in the task management screen 6 illustrated in FIG. 7 to "complete". When the "send" button for the task (not illustrated) is then pressed, the progress management information updating module 47 sends the details thereof to the server 1, and the task data 146 is updated. The ordering party of the task can confirm the update and then carry out an operation to change the progress 623 to "confirmed". The task is completed as a result, and the task browsing processing module 432 then deletes the task display 611 of that task from the task management screen 6. The task is also subtracted from the task numbers 513 and 514 displayed in the data management screen 5.

5. Effects 5-1

According to the present embodiment, tasks associated with each instance of game data are created, and the tasks are stored in the task storage unit 133. As such, the game data and the tasks can be reliably associated with each other. This makes it possible to prevent tasks from being lost track of, left without being carried out, and so on. Additionally, the tasks are associated with the game data regardless of the names of the game data, and thus it is easy to browse tasks from the game data, or browse game data from the tasks.

Although tasks can also be ordered for objects, the tasks are ordered at the level of the game data, which is the smallest unit for which work is carried out. This makes it possible to order tasks at a more detailed level. Furthermore, even in the case where different game developers serve as administrators for a single object depending on the type of the data pertaining to the object, orders for tasks can be issued to the correct game developers.

5-2 An object present in a game image can be selected, and a task can be created for the game data pertaining to that object from that game image. Tasks can therefore be created more efficiently, while visually confirming the object, as compared to a situation in which tasks are created from the list of game data.

6. Variations

An embodiment of the present invention has been described thus far. However, the present invention is not intended to be limited to the above-described embodiment. Many variations can be made thereon without departing from the essential spirit of the present invention. The following variations are possible, for example. The following variations can also be combined as appropriate.

6-1

Figure 12:
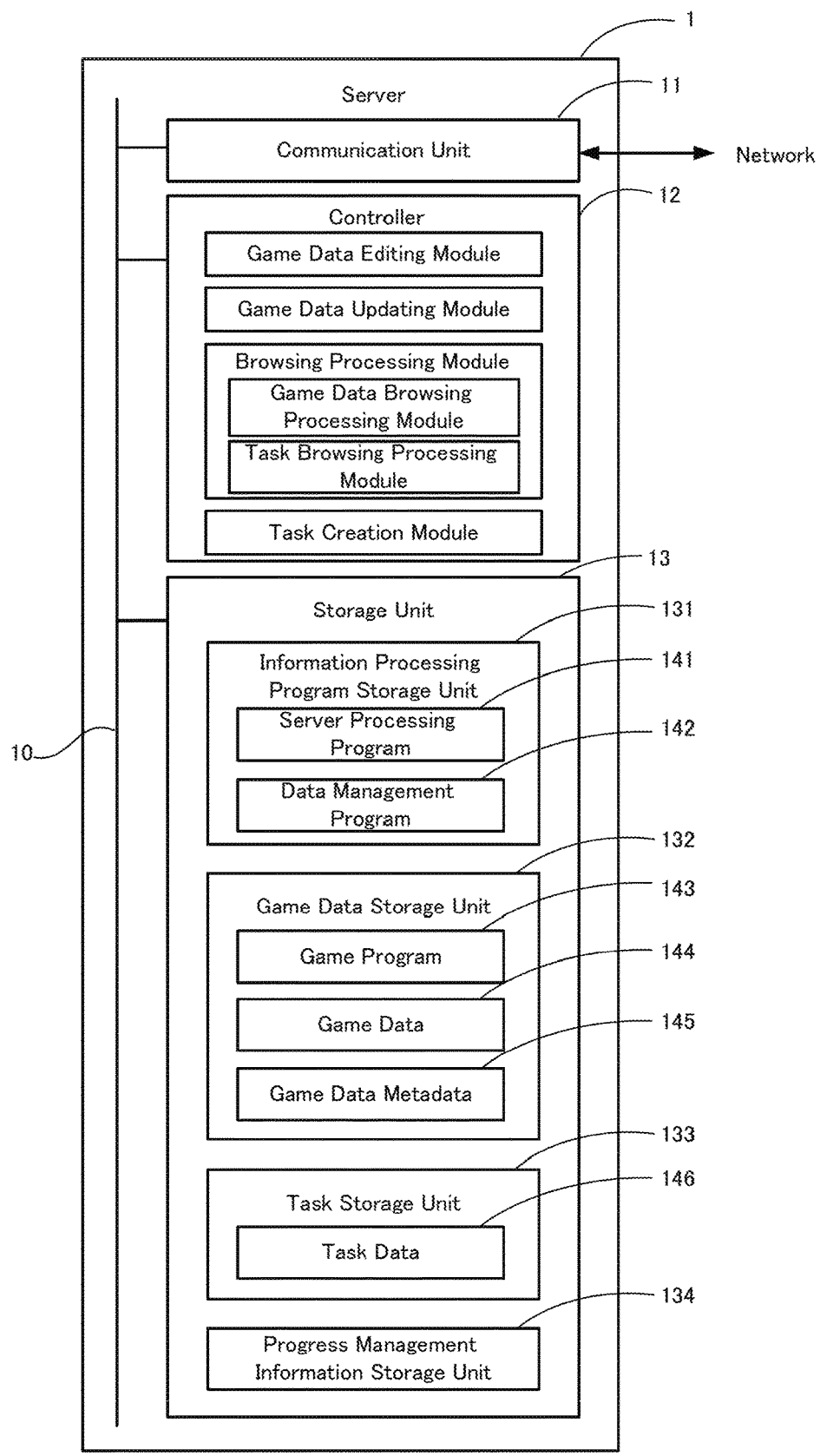
FIG. 12 is a block diagram illustrating another configuration of a server.

The foregoing embodiment describes downloading the data management program 142 to the game development terminal 3 from the server 1 and then editing the game data, managing tasks, and so on. However, this processing may be carried out using the server 1. In other words, the server 1 can be accessed from the game development terminal 3, and programs in the server 1 can then be executed and displayed in the display unit of the game development terminal 3, data can be processed, and so on. In other words, the functional elements 41 to 47 of the controller 311 of the game development terminal 3 illustrated in FIG. 3 can also be executed by the server 1, as illustrated in FIG. 12, for example.

6-2

In the foregoing embodiment, the data management screen is displayed by downloading the data management program 142 stored in the server 1 and then executing that program. However, the data management program 142 can also be stored in the storage unit 312, the ROM, or the like of the game development terminal 3.

6-3

When executing the game program 143 in the game development terminal 3, the program can be executed in the terminal main unit 31, and the game image can be displayed in the game device 32.

6-4

In the foregoing embodiment, the game device 32 is included in the game development terminal 3. However, if the game can be executed without using a dedicated game device, such as by a smartphone or personal computer, the display unit that displays the game image can be the display unit 313 provided in the terminal main unit 31 as described above, or the game image can be displayed in a display unit provided separate from the terminal main unit 31.

6-5

Priorities can be indicated for the task numbers 513 and 514 using color. Furthermore, the positions where the task numbers 513 in 514 are displayed are not particularly limited, and may be any positions corresponding to the game data, the objects, and so on.

6-6 In the foregoing embodiment, the game data editing module 41 edits the game data 144 stored in the server 1. However, the game data editing module 41 can also create new game data, and can associate tasks with such newly-created game data.

6-7

The configurations of the screens 5, 6, and 7 described in the foregoing embodiment are merely examples, and the layouts of the screens, the display items, the buttons, and so on can be changed as appropriate.

What is claimed is:

1. A game development system comprising:
   processing resources including at least one processor;
   a server; and
   at least one game development terminal,
   the server including:
      a game data store configured to store game data for a game under development; and
      a task store configured to store indications of tasks to be carried out by a game developer on associated game data;
   each of the game development terminals including:
      a transceiver configured to facilitate communication between the respective game development terminal and the server; and
      a display;
   wherein the processing resources are configured to at least:
      provide (a) a game data browser configured to present a first list for the game data stored in the game data store in response to an instruction operation made by an operator operating the respective game development terminal, and (b) a task browser configured to present a second list including the tasks;
      responsive to operator selection of one of the tasks, generate for output the game data associated with that selected task; and
      responsive to operator selection of game data, generate, for output, the task(s) associated with that selected game data;
   wherein the game data browser is further configured to display:
      a name of an object appearing in the game in a hierarchical structure in accordance with an attribute thereof, wherein the name of the game data corresponding to the object is displayed in a lower part of the hierarchical structure; and
      a total number of tasks to be carried out on all instances of the game data below the object in the hierarchical structure, in a position corresponding to the name of the object.

2. The game development system according to claim 1, wherein the at least one processor is further configured to at least:
   cause a game image to be displayed via the display of at least one of the game development terminals by obtaining and executing a game program;
   enable operator selection of an object present in the game image displayed via the display; and
   perform task manipulation in association with the game data pertaining to the object selected.

3. The game development system according to claim 2, wherein the game program is retrieved from the game data store.

4. The game development system according to claim 2, wherein the game program is a part of the game data.

5. The game development system according to claim 2, wherein the task manipulation includes task creation.

6. The game development system according to claim 1, wherein:
   an administrator is set for each instance of the game data; and
   the task browser is configured to list the tasks associated with the game data for which the game developer using that browser is set as the administrator.

7. The game development system according to claim 1, wherein:
   the server further includes a progress management information store configured to store progress management information associated with each instance of the game data; and each game development terminal is further configured to cause the respective game development terminal to at least update the progress management information in response to an instruction operation made by the operator.

8. The game development system according to claim 1, wherein the game data browser is further configured to display a quantity of tasks to be carried out for the game data included in the first list as a number in a position corresponding to a name of the game data.

9. The game development system according to claim 1, wherein the game data browser is further configured to display, as top levels in the hierarchical structure, names of a plurality of different objects that each appear in the game.

10. The game development system according to claim 9, wherein the hierarchical structure includes a plurality of sub-objects for at least one of the objects, each of the sub-objects appearing in the game.

11. The game development system according to claim 9, wherein the game data corresponding to a given object pertains to a model of how the given object is to be presented in the game, a manner in which the given object is to be animated in the game, and/or physics-related properties of the given object in the game.

12. The game development system according to claim 9, wherein the game data corresponding to a given object is divided into plural instances of game data, each of the instances of game data being separately listed in the hierarchical structure, the instances including a model of how the given object is to be presented in the game, a manner in which the given object is to be animated in the game, and/or physics-related properties of the given object in the game.

13. The game development system according to claim 1, wherein each game data entry in the first list has a game object associated therewith.

14. The game development system according to claim 13, wherein each game data entry represents, for the associated game object, a model of how the associated game object is to be presented in the game, a manner in which the associated game object is to be animated in the game, and/or physics-related properties of the associated game object in the game.

15. The game development system according to claim 1, wherein the server comprises the processing resources.

16. The game development system according to claim 1, wherein the processing resources are provided to each said game development terminal.

17. A game development method carried out in a system including a server and a game development terminal configured to communicate with the server for a game being developed, the method comprising:
  causing a first list for game data stored in the server to be displayed via the game development terminal in response to an instruction operation made by an operator operating the game development terminal;
  causing a second list including tasks to be displayed via the game development terminal;
  responsive to operator selection of one of the tasks, generating for output via the game development terminal, the game data associated with that selected task; and
  responsive to operator selection of game data, generating for output via the game development terminal, the task(s) associated with that selected game data;
  wherein a name of an object appearing in the game is generated for display in a hierarchical structure in accordance with an attribute thereof, wherein the name of the game data corresponding to the object is displayed in a lower part of the hierarchical structure; and
  wherein a total number of tasks to be carried out on all instances of the game data is generated for display below the object in the hierarchical structure, in a position corresponding to the name of the object.

18. The game development method according to claim 17, wherein the game data corresponding to a given object is divided into plural instances of game data, each of the instances of game data being separately listed in the hierarchical structure, the instances including a model of how the given object is to be presented in the game, a manner in which the given object is to be animated in the game, and/or physics-related properties of the given object in the game.

19. A game development terminal configured to communicate with a server, the server storing game data and tasks carried out by a game developer on the game data and associated with that game data in connection with a game being developed, the terminal comprising:
  at least one processor;
  a transceiver configured to facilitate communication with the server; and
  a display;
  wherein the at least one processor is configured to at least:
    provide a game data browser configured to present a first list for the game data stored in the server in response to an instruction operation made by an operator operating the game development terminal;
    provide a task browser configured to present a second list including the tasks;
    responsive to operator selection of one of the tasks, generate, for output via the display, the game data associated with that selected task; and
    responsive to operator selection of game data, generate, for output via the respective display, the task(s) associated with that selected game data; and
  wherein the game data browser is further configured to display:
    a name of an object appearing in the game in a hierarchical structure in accordance with an attribute thereof, wherein the name of the game data corresponding to the object is displayed in a lower part of the hierarchical structure; and
    a total number of tasks to be carried out on all instances of the game data below the object in the hierarchical structure, in a position corresponding to the name of the object.

20. A non-transitory computer readable storage medium tangibly storing a game development program for a game under development, the game development program being executable by a computer of a game development terminal that is configured to communicate with a server, the server storing indications of tasks carried out by a game developer on associated game data, the program causing the computer to perform functionality comprising:
  causing a first list for the game data stored in the server to be displayed in response to an instruction operation made by an operator operating the game development terminal;
  causing a second list including the tasks stored in the server to be displayed in response to input from the operator;
  causing, responsive to operator selection of one of the tasks, the game data associated with that selected task to be displayed; and causing, responsive to operator selection of game data, the tasks associated with that selected game data to be displayed;

wherein a name of an object appearing in the game is generated for display in a hierarchical structure in accordance with an attribute thereof, wherein the name of the game data corresponding to the object is displayed in a lower part of the hierarchical structure; and wherein a total number of tasks to be carried out on all instances of the game data is generated for display below the object in the hierarchical structure, in a position corresponding to the name of the object.

* * * * *